United States Patent
Tobe et al.

(10) Patent No.: US 8,590,327 B2
(45) Date of Patent: Nov. 26, 2013

(54) REFRIGERATING APPARATUS

(75) Inventors: Ryuzo Tobe, Osaka (JP); Tetsuo Sakurai, Osaka (JP); Ryuichi Tsuruma, Osaka (JP)

(73) Assignee: Panasonic Healthcare Co., Ltd., Toon-shi, Ehime (JP)

( * ) Notice: Subject to any disclaimer, the term of this patent is extended or adjusted under 35 U.S.C. 154(b) by 214 days.

(21) Appl. No.: 12/826,516

(22) Filed: Jun. 29, 2010

(65) Prior Publication Data

US 2010/0326109 A1 Dec. 30, 2010

Related U.S. Application Data

(63) Continuation of application No. PCT/JP2009/066118, filed on Sep. 16, 2009.

(30) Foreign Application Priority Data

Sep. 16, 2008 (JP) .................................. 2008-237039
Sep. 14, 2009 (JP) .................................. 2009-211299

(51) Int. Cl.
*F25B 7/00* (2006.01)

(52) U.S. Cl.
USPC ........ 62/175; 62/73; 62/113; 62/115; 62/185; 62/198; 62/203; 62/228.1; 62/228.4; 62/229; 62/440; 62/498; 62/513

(58) Field of Classification Search
USPC ............. 62/79, 113, 115, 175, 185, 198, 203, 62/228.1, 228.4, 229, 440, 498, 513
See application file for complete search history.

(56) References Cited

U.S. PATENT DOCUMENTS

| 5,875,637 | A  | * | 3/1999  | Paetow ........................... 62/117 |
| 6,539,736 | B1 | * | 4/2003  | Isazawa et al. ................. 62/175 |
| 7,526,924 | B2 | * | 5/2009  | Wakamoto et al. ............ 62/175 |
| 2003/0213255 | A1 | * | 11/2003 | Nosaka .......................... 62/175 |

FOREIGN PATENT DOCUMENTS

| JP | 2-143056   | 6/1990 |
| JP | 5-142294   | 6/1993 |
| JP | 2004-190917 | 7/2004 |
| JP | 2005-241176 | 9/2005 |

OTHER PUBLICATIONS

English Patent Abstracts of Japan for application, Publication No. 2005-241176, Publication date: Sep. 8, 2005, (1 page).

(Continued)

*Primary Examiner* — Frantz Jules
*Assistant Examiner* — Azim Abdur Rahim
(74) *Attorney, Agent, or Firm* — McDermott Will & Emery LLP (57) ABSTRACT

A refrigerating apparatus for keeping an inside of a storage at a predetermined low-temperature state includes first and second refrigerant circuits including compressors, condensers, decompressors, and evaporators, connected circularly with pipings to form refrigerating cycles, the circuit having a first or second refrigerant sealed therein as a working refrigerant, a first sensor which detects a temperature of a cascade condenser constituted by integrating the evaporator of the first refrigerant circuit and the condenser of the second refrigerant circuit in a heat exchangeable manner, first and second controllers which control operation performances of the first and second compressors in a variable manner based on first and second sensor detected temperatures in order that the first and second sensor detected temperatures are first and second temperatures, respectively, and a second sensor which detects a temperature inside the storage.

4 Claims, 6 Drawing Sheets

(56) References Cited

OTHER PUBLICATIONS

Mechanical English Translation for application with Publication No. 2005-241176, Publication date: Sep. 8, 2005, (17 pages).
English Patent Abstracts of Japan for application with Publication No. 2004-190917; Publication date: Jul. 8, 2004, (1 page).
Mechanical English Translation for application with Publication No. 2004-190917; Publication date; Jul. 8, 2004, (16 pages).
English Patent Abstracts of Japan for application with Publication No. 05-142294; Publication date: Jun. 8, 1993, (1 page).
Mechanical English Translation for application with Publication No. 05-142294, Publication date: Jun. 8, 1993, (10 pages).
English Patent Abstracts of Japan for application with Publication No. 02-143056; Publication date: Jun. 1, 1990, (1 page).

\* cited by examiner

REFRIGERATING APPARATUS

CROSS-REFERENCE TO RELATED APPLICATIONS

This is a continuation application of International Patent Application No. PCT/JP2009/066118 filed Sep. 16, 2009, which claims the benefit of priority to Japanese Patent Application Nos. 2008-237039 and 2009-211299, filed Sep. 16, 2008 and filed Sep. 14, 2009, respectively. The full contents of the International Patent Application are incorporated herein by reference.

BACKGROUND OF THE INVENTION

1. Field of the Invention

The present invention relates to a refrigerating apparatus.

2. Description of the Related Art

As a refrigerating apparatus configured to cool an inside of a low-temperature storage which stores storage objects such as refrigerated articles, for example, a dual refrigerating apparatus is known. The dual refrigerating apparatus includes a high-temperature side refrigerant circuit in which a first refrigerant is sealed and a low-temperature side refrigerant circuit in which a second refrigerant whose boiling point is lower than that of the first refrigerant is sealed. Also, an evaporator of the high-temperature side refrigerant circuit (hereinafter referred to as a high-temperature side evaporator) and a condenser of the low-temperature side refrigerant circuit (hereinafter referred to as a low-temperature side condenser) form a cascade condenser so as to mutually exchange heat. As a result, the second refrigerant is condensed by a cooling effect of the high-temperature side refrigerant circuit and the inside of the storage is cooled by the cooling effect of the low-temperature side refrigerant circuit. A cooling temperature inside the storage is detected by a sensor. In accordance with the detected cooling temperature of the inside of the storage, rotation speeds of a compressor of the high-temperature side refrigerant circuit (hereinafter referred to as a high-temperature side compressor) and a compressor of the low-temperature side refrigerant circuit (hereinafter referred to as a low-temperature side compressor) are controlled, respectively, and the inside of the storage is brought to a target cooling temperature (e.g., see Japanese Patent Laid-Open No. 5-142294).

In a case where control is made in such a manner that the cooling temperature inside the storage becomes constant, a temperature of the cascade condenser is preferably at a constant temperature. However, if specifications of the high-temperature side compressor and the low-temperature side compressor are different or their performances vary even if the specifications are the same, despite the fact that operations of the both compressors are simultaneously controlled by a detection output of the sensor, timings at which an evaporation temperature of the high-temperature side evaporator and a condensation temperature of the low-temperature side condenser are changed might not match, or rates of the change of the evaporation temperature of the high-temperature side evaporator and the condensation temperature of the low-temperature side condenser might be biased more than necessary. In this case, if the cooling temperature inside the storage changes, there was a possibility that time required until the temperature of the cascade condenser comes to a constant temperature becomes longer and the time until the cooling temperature in the storage comes to the constant temperature becomes longer.

SUMMARY OF THE INVENTION

A refrigerating apparatus, which keeps a temperature inside a storage at a predetermined low-temperature state, according to an aspect of the present invention, comprises:
- a first refrigerant circuit including a first compressor, a first condenser, a first decompressor, and a first evaporator, connected circularly with a first piping to form a refrigerating cycle, the first refrigerant circuit having a first refrigerant sealed therein as a working refrigerant;
- a second refrigerant circuit including a second compressor, a second condenser, a second decompressor, and a second evaporator, connected circularly with a second piping to form a refrigerating cycle, the second refrigerant circuit having a second refrigerant sealed therein as a working refrigerant;
- a first sensor configured to detect a temperature of a cascade condenser constituted by integrating the first evaporator and the second condenser in a heat exchangeable manner;
- a first controller configured to control an operation performance of the first compressor in a variable manner based on the temperature detected by the first sensor in order that the temperature detected by the first sensor is a first temperature;
- a second sensor configured to detect a temperature inside the storage; and
- a second controller configured to control an operation performance of the second compressor in a variable manner based on the temperature detected by the second sensor in order that the temperature detected by the second sensor is a second temperature.

The present invention has an object to improve controllability of a temperature inside the storage.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Configuration of the Refrigerating Apparatus

<Overall Configuration>

Figure 1:
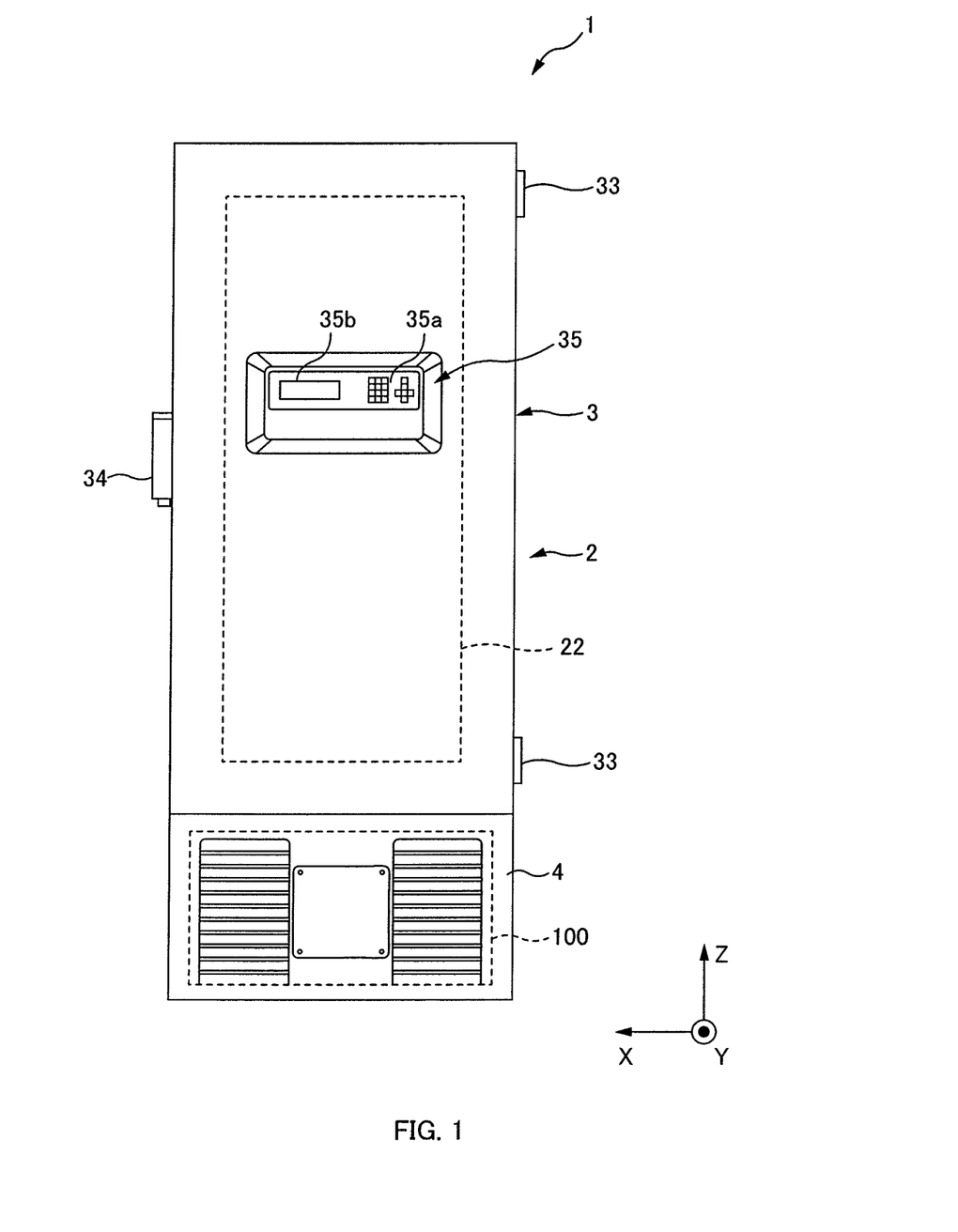
FIG. 1 is a front view of a refrigerating apparatus 1 according to an embodiment.
Figure 2:
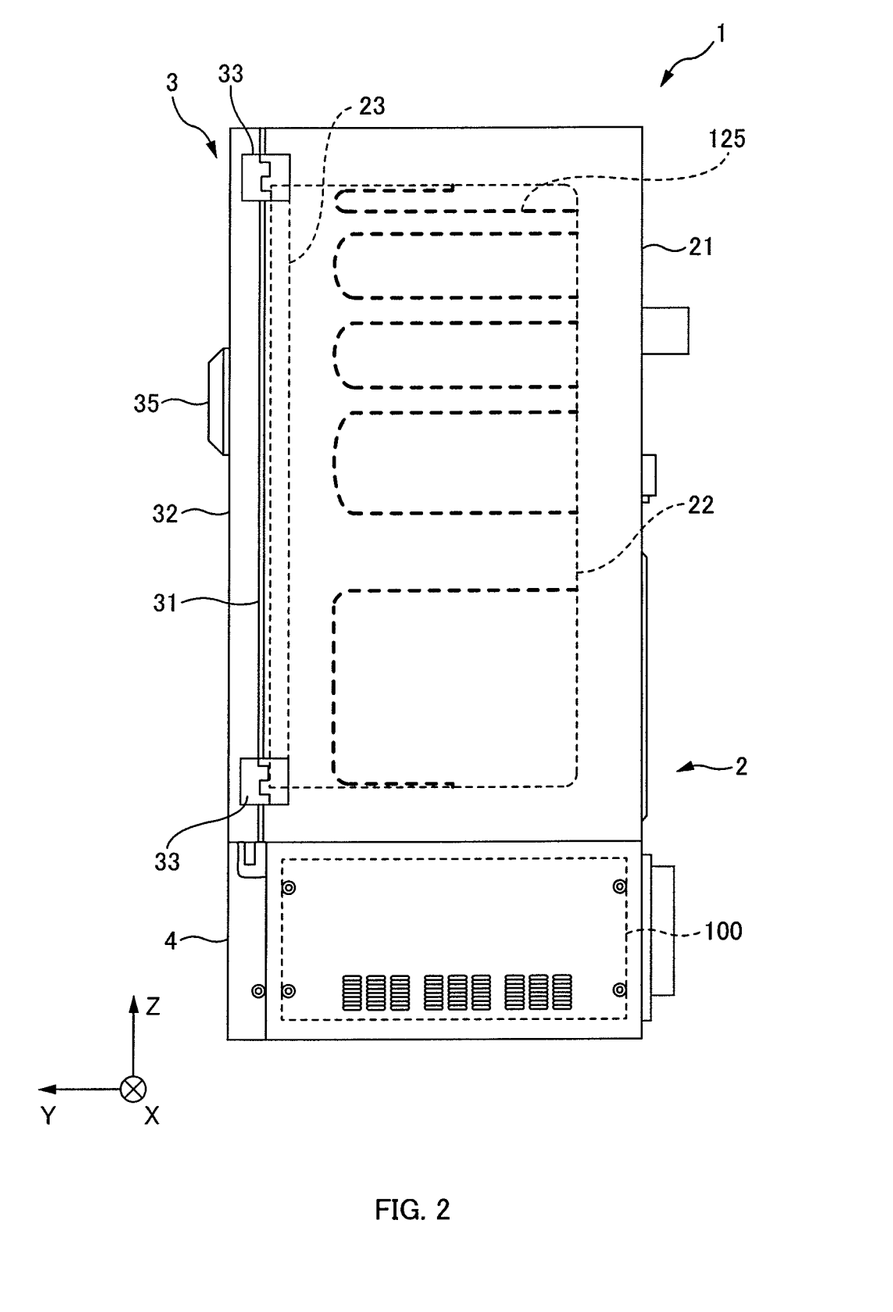
FIG. 2 is a side view of the refrigerating apparatus 1 in FIG. 1 when seen from the right side (−X side in FIG. 1)

An example of an overall configuration of a refrigerating apparatus 1 according to the present embodiment will be described with reference to FIGS. 1 and 2. FIG. 1 is a front view of the refrigerating apparatus 1 according to this embodiment. FIG. 2 is a side view illustrating the refrigerating apparatus 1 in FIG. 1 when seen from the right side (−X side in FIG. 1).

The refrigerating apparatus 1 includes an insulation housing 2 having an opening in a front face (+Y side face), an insulation door 3 configured to open and close the opening of the insulation housing 2, and a machine chamber 4 at a lower side (−Z side) of the insulation housing 2.

The insulation housing 2 includes an outer box 21 and an inner box 22 which are made of metal, for example, and a foaming insulation material (not shown) including an insulation material made of a synthetic resin or a vacuum insulation material. The inner box 22 has an opening in a front face and stores refrigerated articles or the like inside. The inside of the inner box 22 will be referred to as an inside the storage. The outer box 21 has an opening in a front face and accommodates the inner box 22 inside. The foaming insulation material is filled between the outer box 21 and the inner box 22 and improves an insulation effect inside the storage. The inner box 22 is provided with an inner door 23 configured to open and close the opening thereof. The inner door 23 is made of a resin, for example, and improves the insulation effect inside the storage.

The insulation door 3 has an outer plate 32 and an inner plate 31 which are made of metal, for example, and is configured in such a manner that a foaming insulation material (not shown) is filled in a space between the two plates 31 and 32. The insulation door 3 opens and closes the opening of the insulation housing 2 through a hinge 33. On the insulation door 3, a handle 34 with which a user opens and closes the door 3 is provided. The handle 34 has a lock mechanism (not shown) for fixing a state in which the insulation door 3 closes the opening of the insulation housing 2 or for releasing the fixation. Also, on a front face of the outer plate 32 of the insulation door 3, a control panel 35 is provided. The control panel 35 has a control board 201, a keyboard 35a, a display 35b and the like, which will be described later. The keyboard 35a is configured to set a temperature inside the storage (second temperature, for example, which will be described later) by a user, for example, and the display 35b is configured to display this temperature setting, for example.

In the machine chamber 4, a refrigerant circuit 100 excluding a second evaporator 125, which will be described later, is accommodated. As exemplified by a dot line in FIG. 2, a pipe made of, for example, copper or aluminum which forms the second evaporator 125 is attached to an outer face of the inner box 22 in a thermally conductive manner and cools the inside of the inner box 22 with a heat absorption action which occurs when a refrigerant is evaporated by the second evaporator 125.

<Refrigerant Circuit and Control Circuit>

Figure 3:
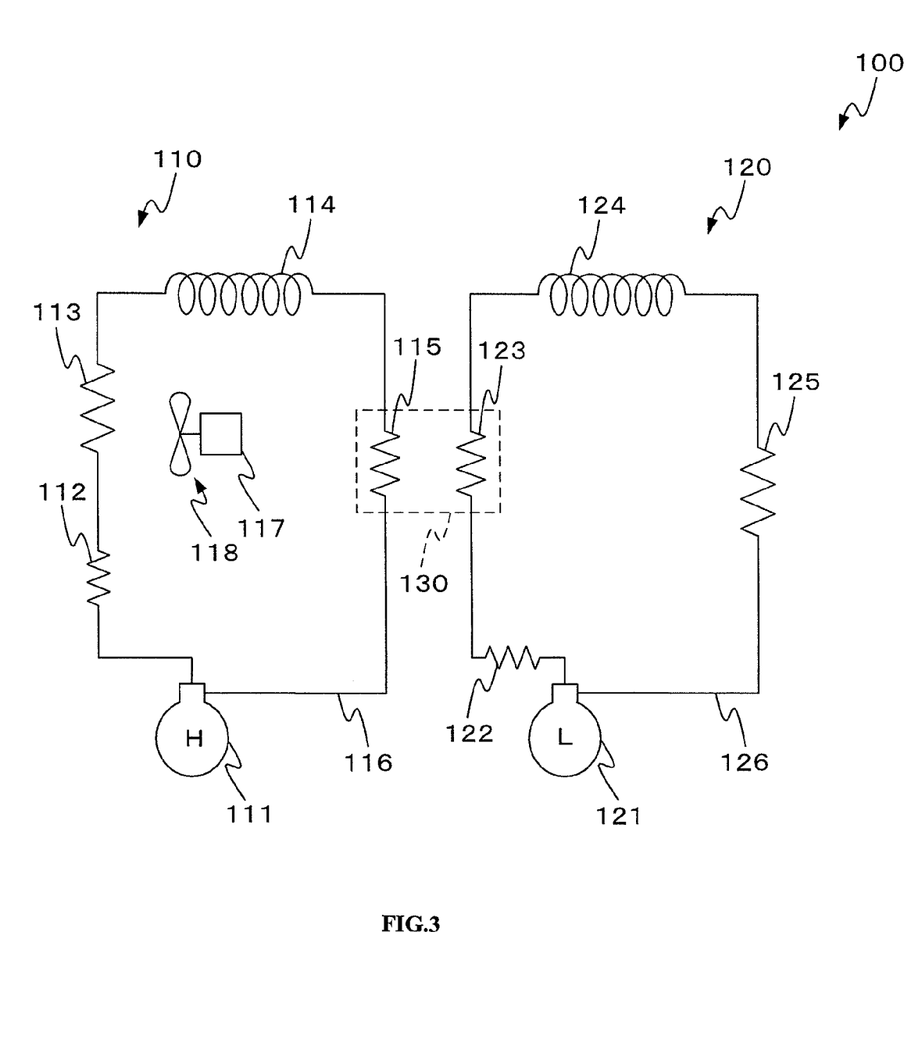
FIG. 3 is a circuit diagram illustrating an example of a refrigerant circuit 100 according to the embodiment.
Figure 4:
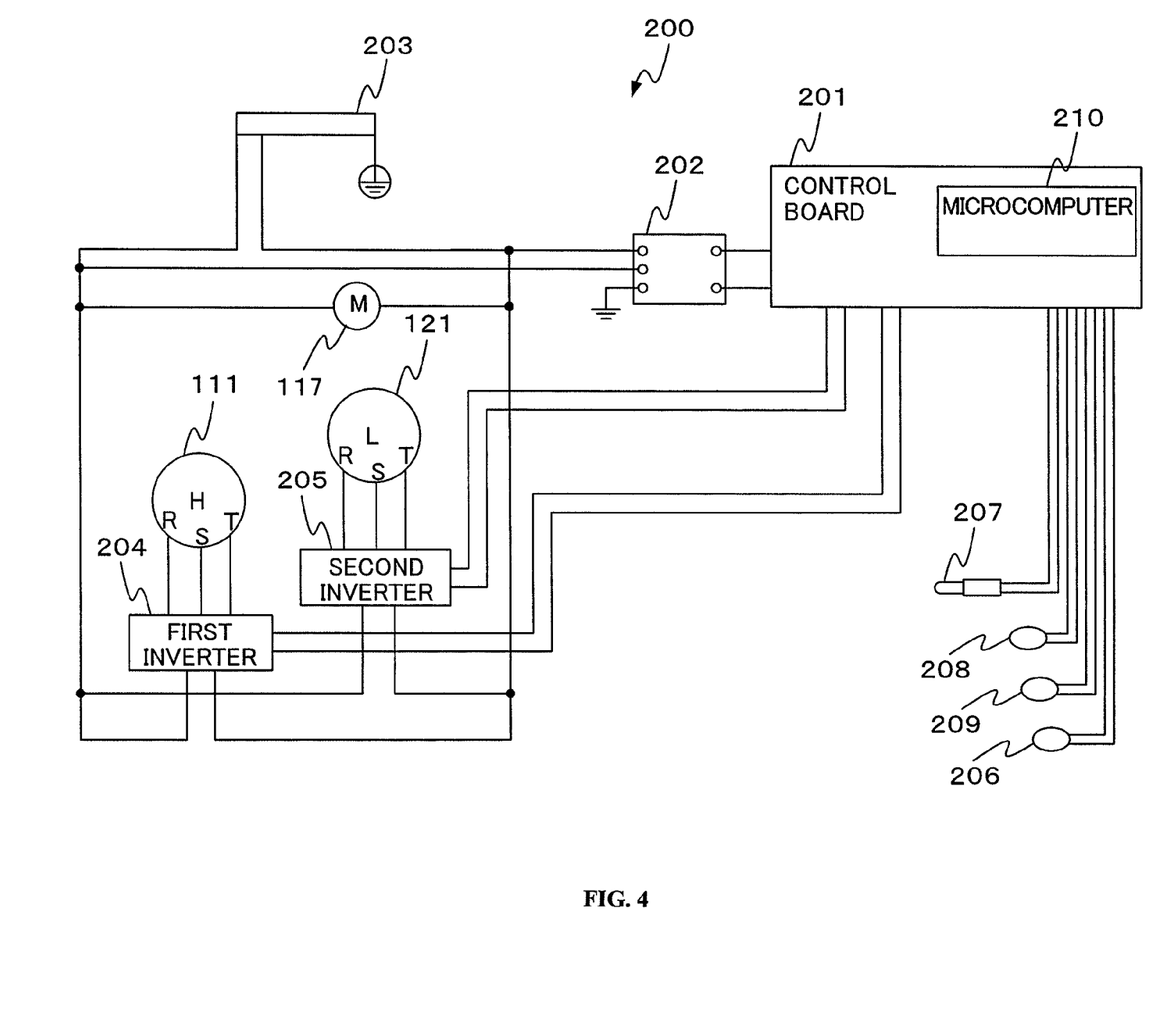
FIG. 4 is a block diagram illustrating an example of a control circuit 200 according to the embodiment.

A configuration example of the refrigerant circuit 100 and a control circuit 200 provided in the refrigerating apparatus 1 according to this embodiment will be described below with reference to FIGS. 3 and 4. FIG. 3 is a circuit diagram illustrating an example of the refrigerant circuit 100 according to the present embodiment. FIG. 4 is a block diagram illustrating an example of the control circuit 200 according to the present embodiment.

The refrigerant circuit 100 includes, as exemplified in FIG. 3, a first refrigerant circuit 110 in which a first refrigerant is sealed and a second refrigerant circuit 120 in which a second refrigerant whose boiling point (evaporation temperature) is lower than that of the first refrigerant is sealed.

The first refrigerant circuit 110 includes a first compressor 111 configured to compress the first refrigerant to a high-temperature/high-pressure gas refrigerant and to discharge it, a first upstream-stage condenser (first condenser) 112 and a first downstream-stage condenser (first condenser) 113 which are configured to cool the first refrigerant discharged from the first compressor 111 and to condense it to a low-temperature and high-pressure refrigerant, a first decompressor (flow-passage variable valve, a capillary tube and the like) 114, and a first evaporator 115 configured to evaporate the first refrigerant which has been brought to a low-temperature and high-pressure, which are connected circularly with a first piping 116.

A suction side of the first compressor 111 is connected to the first evaporator 115, and a discharge side of the first compressor 111 is connected to the first upstream-stage condenser 112. In FIGS. 3 and 4, "H" means a high-temperature side compressor representing the first compressor 111 in the first refrigerant circuit 110, while "L" means a low-temperature side compressor (a second compressor 121 in the second refrigerant circuit 120), which will be described later.

The first upstream-stage condenser 112 is a condenser formed by meandering a pipe made of, for example, copper or aluminum which is configured to cool the first refrigerant compressed by the first compressor 111 and may be formed as a portion of the first condenser. The first upstream-stage condenser 112 may be used as a heat source for evaporating drain water generated from the evaporator or used as a heat source for preventing condensation on a portion where the insulation door 3 or the inner door 23 or the like is in contact with the outer box 21 and the inner box 22.

The first downstream-stage condenser 113 is a condenser formed by meandering a pipe made of, for example, copper or aluminum, which is configured to further cool the first refrigerant which radiated heat in the first upstream-stage condenser 112 and whose temperature has been decreased.

To the first upstream-stage condenser 112 and the first downstream-stage condenser 113, air is blown by, for example, a fan 118 having a fan motor 117 which will be described later, through a filter (not shown) for removing dusts. As a result, heat radiation from the first refrigerant to the air in the condensers 112 and 113 is promoted, and the refrigerant is condensed in the first downstream-stage condenser 113 and becomes a low-temperature and high-pressure refrigerant.

A first decompressor 114 is, for example, a capillary tube configured to decompress the first refrigerant which has been condensed by the first downstream-stage condenser 113. A flow-rate control valve capable of adjusting a flow rate of the refrigerant may be used.

The first evaporator 115 is an evaporator configured to evaporate the first refrigerant which has been decompressed by the first decompressor 114 and forms a cascade condenser 130 together with a second downstream-stage condenser 123 of the second refrigerant circuit 120. The cascade condenser 130 is constituted by integrating the first evaporator 115 and the second downstream-stage condenser 123 in a heat exchangeable manner, and a double tube or a plate-shaped heat exchanger may be used, for example. That is, by means of a heat absorption action which occurs when the first refrigerant is evaporated by the first evaporator 115, the second refrigerant of the second downstream-stage condenser 123 is cooled. The first refrigerant is evaporated by the first evaporator 115 and then, is circulated through the first refrigerant circuit 110 by being sucked into the first compressor 111 again.

Substantially similarly to the first refrigerant circuit 110, the second refrigerant circuit 120 includes the second compressor 121, a second upstream-stage condenser 122, the second downstream-stage condenser (second condenser) 123, a second decompressor 124, and the second evaporator 125, which are circularly connected by a second piping 126.

The second compressor 121 compresses the second refrigerant. The second upstream-stage condenser 122 has a configuration similar to that of the first upstream-stage condenser of the first refrigerant circuit 110 and works similarly. The second downstream-stage condenser 123 forms a part of the above-mentioned cascade condenser 130 and is cooled by a heat absorption action of the first refrigerant evaporated by the first evaporator. The second decompressor 124 has a configuration similar to that of the first decompressor 114 of the first refrigerant circuit 110 and works similarly. The second evaporator 125 evaporates the second refrigerant decompressed by the second decompressor 124. By means of the heat absorption action which occurs when the second refrigerant is evaporated by the second evaporator 125, the inside of the storage is cooled through the inner box 22. The second refrigerant is evaporated by the second evaporator 125 and then, is circulated through the second refrigerant circuit 120 by being sucked into the second compressor 121 again.

The above-mentioned refrigerant circuit 100 is controlled by the control circuit 200. The control circuit 200 has, as exemplified in FIG. 4, a first sensor 206, a second sensor 207, the control board 201 on which the microcomputer 210 is mounted, a first inverter 204, and a second inverter 205.

The first sensor 206 detects a temperature of the cascade condenser 130. A temperature detected by the first sensor 206 is hereinafter referred to as a first detected temperature. The first sensor 206 is mounted so as to detect a piping temperature in the vicinity of an outlet of the first evaporator 115 constituting the cascade condenser 130 or a temperature of the first refrigerant in the vicinity of the outlet. The temperature sensor 206 may be mounted in such a manner that a temperature of the first refrigerant in the first evaporator 115 constituting the evaporator in the cascade condenser 130, that is, an evaporation temperature of the first refrigerant can be detected. Also, it is possible to modify control, which will be described below, on the basis of a temperature difference between a temperature of the piping (or the first refrigerant) in the vicinity of an inlet of the first evaporator and a temperature of the piping (or the first refrigerant) in the vicinity of the outlet thereof, and it is also possible to use a temperature of the piping (or the first refrigerant) in the vicinity of the inlet of the evaporator, a temperature of the piping (or the first refrigerant) in the vicinity of the inlet of the second downstream-stage condenser 123, and a temperature of the piping (or the first refrigerant) in the vicinity of the outlet thereof.

The second sensor 207 detects a temperature inside the storage. A temperature detected by the second sensor 207 will be hereinafter referred to as a second detected temperature.

The microcomputer 210 mounted on the control board 201 compares the first detected temperature with a first temperature determined in advance and outputs a first control signal for controlling the number of revolutions of the first compressor 111 to the first inverter 204 in accordance with a comparison result. Also, the microcomputer 210 compares the second detected temperature with a second temperature determined in advance and outputs a second control signal for controlling the number of revolutions of the second compressor 121 to the second inverter 205 in accordance with a comparison result. The control board 201 is supplied with electric power from a switching power source 202 and the switching power source 202 is supplied with electric power through a power cable 203.

The first inverter 204 converts a single-phase alternating-current voltage from the power cable 203 to a three-phase alternating-current voltage and applies it to a three-phase coil motor (not shown) of the first compressor 111. The first inverter 204 has a configuration in which a plurality of power transistors (not shown) and the like configured to supply power to the first compressor 111 are connected in a three-phase bridge state, for example. When each of the plurality of power transistors is turned on/off by the above-mentioned first control signal, the number of revolutions of the first compressor 111 is controlled. That is, by means of the first inverter 204 and the microcomputer 210 (the first controller), the number of revolutions of the first compressor 111 is controlled in order that the temperature of the cascade condenser 130 is the above-mentioned first temperature.

The second inverter 205 converts the single-phase alternating-current voltage from the power cable 203 to the three-phase alternating-current voltage and applies it to a three-phase coil motor (not shown) of the second compressor 121. Similarly to the first inverter 204, the second inverter 205 includes a plurality of power transistors (not shown) and the like configured to supply power to the second compressor 121, for example. When each of the plurality of power transistors is turned on/off by the above-mentioned second control signal, the number of revolutions of the second compressor 121 is controlled. That is, by means of the second inverter 205 and the microcomputer 210 (the second controller), the number of revolutions of the second compressor 121 is controlled in order that the temperature inside the storage is the above-mentioned second temperature.

According to the exemplification in FIG. 4, the control circuit 200 further has a third sensor 208 and a fourth sensor 209. The third sensor 208 detects a temperature around the first upstream-stage condenser 112 and the first downstream-stage condenser 113, for example. The fourth sensor 209 is a filter sensor configured to detect clogging of the above-mentioned filter which is configured to remove dusts. The microcomputer 210 determines a failure of the fan motor 117 or the like on the basis of a detection result of the third sensor 208 and the fourth sensor 209 and notifies the result to a user through the display 35b or the like, for example.

<Operation of the Refrigerating Apparatus>

Figure 5:
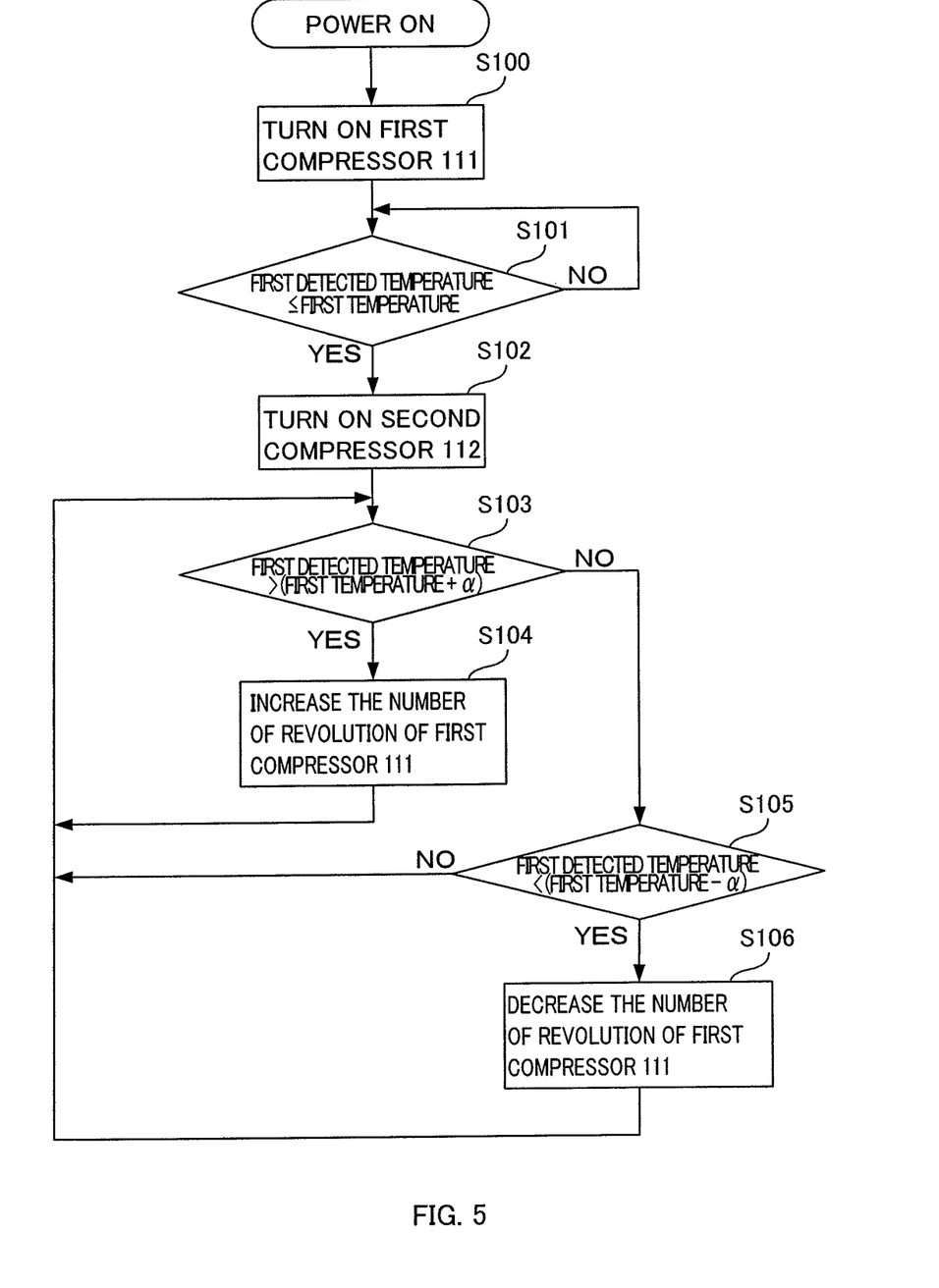
FIG. 5 is a flowchart illustrating an example of a processing procedure of a microcomputer 210 in a case where the refrigerating apparatus 1 controls a rotation speed of a first compressor 111 in accordance with a temperature of a cascade condenser 130.
Figure 6:
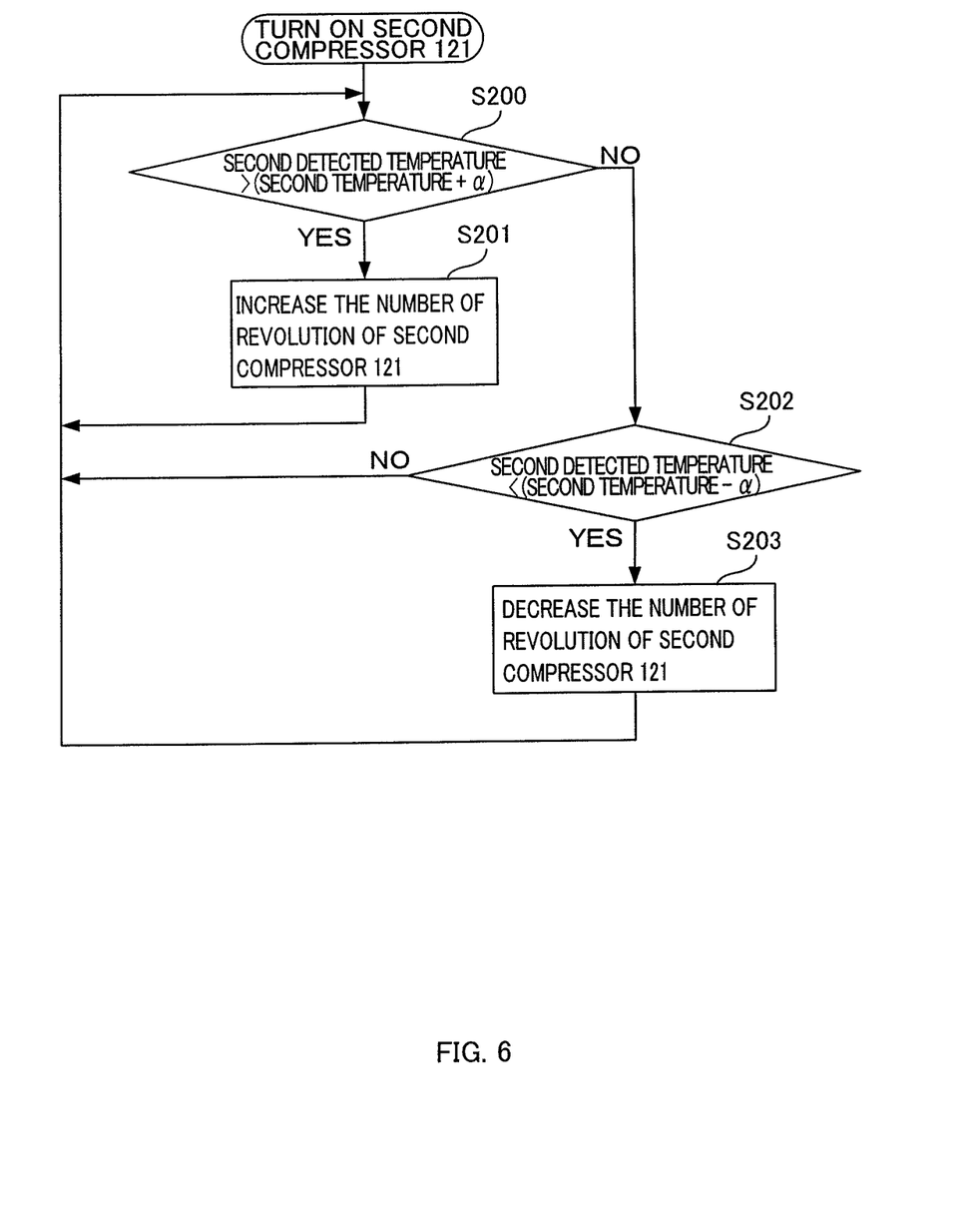
FIG. 6 is a flowchart illustrating an example of the processing procedure of the microcomputer 210 in a case where the refrigerating apparatus 1 controls a rotation speed of a second compressor 121 in accordance with a temperature inside the storage.

An operation of the refrigerating apparatus 1 provided with the above-mentioned configuration will be described below with reference to FIGS. 5 and 6. FIG. 5 is a flowchart illustrating an example of a processing procedure of the microcomputer 210 with which the refrigerating apparatus 1 controls the number of revolutions of the first compressor 111 in accordance with the temperature (first detected temperature) of the cascade condenser 130. FIG. 6 is a flowchart illustrating an example of the processing procedure of the microcomputer 210 with which the refrigerating apparatus 1 controls the number of revolutions of the second compressor 121 in accordance with the temperature (second detected temperature) inside the storage.

As exemplified in FIG. 5, when the refrigerating apparatus 1 is powered on through the power cable 203, the microcomputer 210 first drives the first compressor 111 at a predetermined number of revolutions (S100). Since the first refrigerant starts circulating through the first refrigerant circuit 110 by the operation of the first compressor 111, the temperature of the cascade condenser 130 is decreased by the cooling action which occurs when the first refrigerant is evaporated by the first evaporator 115.

Subsequently, the microcomputer 210 compares the first detected temperature and the first temperature and determines whether or not the first detected temperature is lower than or equal to the first temperature (S101). The first temperature is a temperature determined in advance by a type of the second refrigerant or performance (efficiency or specification) or the like of the second compressor 121, and specifically, it is a temperature of the cascade condenser 130 optimal for condensing the second refrigerant by the second downstream-stage condenser 123.

If it is determined that the first detected temperature is higher than the first temperature (S101: NO), the microcomputer 210 executes the process of Step 101 again.

If it is determined that the first detected temperature is lower than or equal to the first temperature (S101: YES), the microcomputer 210 drives the second compressor 121 at a predetermined number of revolutions (S102).

In this way, first, the first compressor 111 is started up, and when the first detected temperature becomes lower than or equal to the first temperature, the second compressor 121 is started up so that the second refrigerant in the cascade condenser 130 is cooled and can easily reach a predetermined temperature range. Thus, the temperature inside the storage can also easily reach a predetermined temperature mentioned below.

In a case where the second refrigerant starts circulating in the second refrigerant circuit 120 by the operation of the second compressor 121, since the high-temperature second refrigerant is fed to the second downstream-stage condenser 123, it works to increase the temperature of the cascade condenser 130. On the other hand, since the second refrigerant is cooled by exchanging heat with the first refrigerant evaporated in the first evaporator 115, it works to decrease the temperature of the cascade condenser 130. The processing by the microcomputer 210, which will be described below, is to maintain the temperature of the condenser 130 in the predetermined temperature range around the first temperature by controlling the latter action to decrease the temperature of the cascade condenser 130 through the first compressor 111.

The microcomputer 210 compares the first detected temperature and a predetermined temperature higher than the first temperature (first temperature+$\alpha$) and determines whether the first detected temperature is higher than "first temperature+$\alpha$" or not (S103). "First temperature+$\alpha$" is a high-temperature side temperature in the temperature range suitable for condensing the second refrigerant in the cascade condenser 130, for example.

If it is determined that the first detected temperature is higher than "first temperature+$\alpha$" (S103: YES), the microcomputer 210 outputs the first control signal for raising the number of revolutions of the first compressor 111 to the first inverter 204 (S104) and executes the process of Step S103 again. As a result, an amount of the first refrigerant discharged per unit time from the first compressor 111 is increased and an evaporation amount of the refrigerant is increased, cooling capability of the first refrigerant circuit 110 is increased, and the temperature of the cascade condenser 130 is decreased toward an evaporation temperature of the first refrigerant. The microcomputer 210 repeatedly executes the process of Step S103: YES and S104 until the first detected temperature becomes lower than or equal to "first temperature+$\alpha$".

If it is determined that the first detected temperature is lower than or equal to "first temperature+$\alpha$" (S103: NO), the microcomputer 210 compares the first detected temperature and a predetermined temperature lower than the first temperature (first temperature−$\alpha$) and determines whether or not the first detected temperature is lower than "first temperature−$\alpha$" (S105). "First temperature−$\alpha$" is a low-temperature side temperature in the temperature range suitable for sufficiently condensing the second refrigerant in the cascade condenser 130, for example. That is, in condensing the second refrigerant, the temperature of the cascade condenser 130 does not have to be lower than "first temperature−$\alpha$", and a value of $\alpha$ in "first temperature−$\alpha$" may be the same value as or a different value from $\alpha$ which gives the above-mentioned upper-limit temperature of the cascade condenser 130.

If it is determined that the first detected temperature is lower than "first temperature−$\alpha$" (S105: YES), the microcomputer 210 outputs the first control signal for decreasing the number of revolutions of the first compressor 111 to the first inverter 204 (S106) and executes the process of Step S103 again. As a result, the amount of the first refrigerant discharged per unit time from the first compressor 111 is decreased and the cooling capability of the first refrigerant circuit 110 is lowered, and if the amount of the second refrigerant flowing through the second downstream-stage condenser 123 is large, the temperature of the cascade condenser 130 is increased. That is, the temperature of the first refrigerant gasified by the first evaporator 115 is increased by receiving radiation from the second downstream-stage condenser. The microcomputer 210 repeatedly executes the process of Step S103: NO, S105: YES, and S106 until the first detected temperature becomes higher than or equal to "first temperature−$\alpha$".

If it is determined that the first detected temperature is higher than or equal to "first temperature−$\alpha$" (S105: NO), the microcomputer 210 executes the process of Step S103 again. That is, while the first detected temperature is maintained higher than or equal to "first temperature−$\alpha$" and lower than or equal to "first temperature+$\alpha$", the microcomputer 210 repeatedly executes the process of Step S103: NO and S105: NO.

From the above, the temperature of the cascade condenser 130 is maintained in a temperature range suitable for condensing the second refrigerant by controlling the number of revolutions of the first compressor 111. The temperature range is set in advance according to characteristics of the second refrigerant and the like, for example. If the condensation temperature of the second refrigerant is stable in such a temperature range, by slightly controlling the operation of, for example, the second compressor 121, the evaporation temperature of the second evaporator 125 in the second refrigerant circuit 120 can be controlled to a constant temperature, and the temperature inside the storage can also be made stable with respect to load fluctuation in the storage.

In parallel with the above-mentioned process, the microcomputer 210 executes the following process in order to control the operation of the second compressor 121 whose driving has been started at Step S102.

As exemplified in FIG. 6, the microcomputer 210 compares the second detected temperature and a predetermined temperature higher than the second temperature (second temperature+$\alpha$) and determines whether or not the second detected temperature is higher than "second temperature+$\alpha$" (S200). Here, "second temperature+$\alpha$" is a cooling temperature inside the storage which is to be an upper limit when the inside of the storage is maintained in a predetermined temperature range around the second temperature. A value of $\alpha$ in "second temperature+$\alpha$" may be the same value as or a different value from $\alpha$ which gives the above-mentioned high-temperature side temperature or low-temperature side temperature of the cascade condenser 130.

If it is determined that the second detected temperature is higher than "second temperature+α" (S200: YES), the microcomputer 210 outputs a second control signal for increasing the number of revolutions of the second compressor 121 to the second inverter 205 (S201) and executes the process of Step S200 again. As a result, the amount of the second refrigerant discharged per unit time from the second compressor 121 is increased and the cooling capability of the second refrigerant circuit 120 is increased. The microcomputer 210 repeatedly executes the process of Step S200: YES and S201 until the second detected temperature becomes less than or equal to "second temperature+α".

If it is determined that the second detected temperature is less than or equal to "second temperature+α" (S200: NO), the microcomputer 210 compares the second detected temperature and a predetermined temperature lower than the second temperature (second temperature−α) and determines whether or not the second detected temperature is lower than "second temperature−α" (S202). "Second temperature−α" is a lower-limit temperature in the above-mentioned predetermined temperature range, for example. A value of α in "second temperature−α" may be the same value as or a different value from α to give the above-mentioned upper-limit temperature in the predetermined temperature range.

If it is determined that the second detected temperature is lower than "second temperature−α" (S202: YES), the microcomputer 210 outputs the second control signal for decreasing the number of revolutions of the second compressor 121 to the second inverter 205 (S203) and executes the process of Step S200 again. As a result, the amount of the second refrigerant discharged per unit time from the second compressor 121 is decreased and the cooling capability of the second refrigerant circuit 120 is lowered. The microcomputer 210 repeatedly executes the process of Step S200: NO, S202: YES, and S203 until the second detected temperature becomes higher than or equal to "second temperature−α".

If it is determined that the second detected temperature is higher than or equal to "second temperature−α" (S202: NO), the microcomputer 210 executes the process of Step S200 again. That is, while the second detected temperature is maintained higher than or equal to "second temperature−α" and lower than or equal to "second temperature+α", the microcomputer 210 repeatedly executes the process of Step S200: NO and S202: NO.

As mentioned above, in a state in which the temperature of the cascade condenser 130 is maintained in the temperature range suitable for condensing the second refrigerant by the above-mentioned process in FIG. 5, by controlling the number of revolutions of the second compressor 121 in accordance with the process in FIG. 6, the temperature inside the storage is maintained in the predetermined temperature range on the basis of the specification of the refrigerating apparatus 1. That is, the cooling temperature of the second refrigerant circuit 120 can reach the constant temperature more quickly.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A refrigerating apparatus for keeping a temperature inside a storage at a predetermined low-temperature state, the refrigerating apparatus comprising:

a first refrigerant circuit including a first compressor, a first condenser, a first decompressor, and a first evaporator, connected circularly with a first piping to form a refrigerating cycle, the first refrigerant circuit having a first refrigerant sealed therein as a working refrigerant;

a second refrigerant circuit including a second compressor, a second condenser, a second decompressor, and a second evaporator, connected circularly with a second piping to form a refrigerating cycle, the second refrigerant circuit having a second refrigerant sealed therein as a working refrigerant, a cascade condenser being constituted by integrating the first evaporator and the second condenser in a heat-exchangeable manner;

a first sensor configured to detect a temperature of the first refrigerant in a vicinity of an outlet of the first evaporator;

a second sensor configured to detect a temperature inside the storage; and a single controller configured to control an operation performance of the first compressor in a variable manner based on the temperature detected by the first sensor in order that the temperature detected by the first sensor is a first temperature, and to control an operation performance of the second compressor in a variable manner based on the temperature detected by the second sensor in order that the temperature detected by the second sensor is a second temperature, wherein the single controller is configured to start up the first compressor before the second compressor, and to start up the second compressor when the temperature detected by the first sensor decreases below a predetermined temperature.

2. The refrigerating apparatus according to claim 1, wherein
the first compressor is a rotation-type refrigerant compressor whose operation performance can be controlled in a variable manner by varying the number of revolutions thereof, and
the second compressor is a rotation-type refrigerant compressor whose operation performance can be controlled in a variable manner by varying the number of revolutions thereof.

3. The refrigerating apparatus according to claim 2, wherein
the single controller controls the number of revolutions of the first compressor to be increased when the temperature detected by the first sensor increases above a predetermined temperature higher than the first temperature, and controls the number of revolutions of the first compressor to be decreased when the temperature detected by the first sensor decreases below a predetermined temperature lower than the first temperature.

4. The refrigerating apparatus according to claim 3, wherein
the single controller controls the number of revolutions of the second compressor to be increased when the temperature detected by the second sensor increases above a predetermined temperature higher than the second temperature, and controls the number of revolutions of the second compressor to be decreased when the temperature detected by the second sensor decreases below a predetermined temperature lower than the second temperature.

* * * * *